(12) United States Patent
Wilmoth

(10) Patent No.: US 7,503,843 B1
(45) Date of Patent: Mar. 17, 2009

(54) ORIENTATION INDEPENDENT COMPARTMENT PRESSURE RELIEF VALVE

(75) Inventor: Richard C. Wilmoth, Decatur, AL (US)

(73) Assignee: CGR Products, Inc., Decatur, AL (US)

( * ) Notice: Subject to any disclaimer, the term of this patent is extended or adjusted under 35 U.S.C. 154(b) by 883 days.

(21) Appl. No.: 10/751,359

(22) Filed: Jan. 5, 2004

(51) Int. Cl.
*B60H 1/24* (2006.01)

(52) U.S. Cl. .................. 454/162; 454/164; 454/165

(58) Field of Classification Search .............. 454/162, 454/164, 165; 137/858, 855
See application file for complete search history.

(56) References Cited

U.S. PATENT DOCUMENTS

| | | | | |
|---|---|---|---|---|
| 3,896,847 | A * | 7/1975 | Bauer et al. ............. | 137/512.15 |
| 4,972,765 | A * | 11/1990 | Dixon ..................... | 454/164 |
| 5,105,731 | A | 4/1992 | Kraus | |
| 5,105,849 | A | 4/1992 | Clough | |
| 5,194,038 | A | 3/1993 | Klomhaus et al. | |
| 5,243,934 | A * | 9/1993 | Boyesen ................. | 123/73 V |
| 5,247,912 | A * | 9/1993 | Boyesen et al. .......... | 123/65 V |
| 5,263,895 | A * | 11/1993 | Kraus et al. ............. | 454/162 |
| 5,355,910 | A * | 10/1994 | Gies et al. .............. | 137/858 |
| 5,419,739 | A | 5/1995 | Lewis | |
| 5,492,505 | A | 2/1996 | Bell et al. | |
| 5,601,117 | A * | 2/1997 | Lewis et al. ............. | 137/855 |
| 5,727,999 | A | 3/1998 | Lewis | |
| 5,759,097 | A | 6/1998 | Bernoville et al. | |
| 5,823,870 | A | 10/1998 | Emerling et al. | |
| 5,904,618 | A * | 5/1999 | Lewis ..................... | 454/162 |
| 6,026,852 | A | 2/2000 | Barton et al. | |
| 6,210,266 | B1 * | 4/2001 | Barton .................... | 454/162 |
| 6,357,473 | B1 | 3/2002 | Porter et al. | |
| 6,458,027 | B1 | 10/2002 | Stiehl | |
| 6,609,535 | B2 * | 8/2003 | Oppermann et al. ..... | 137/512.15 |
| 2002/0111131 | A1 | 8/2002 | Demerath | |
| 2002/0148507 | A1 | 10/2002 | Porter et al. | |
| 2002/0164943 | A1 | 11/2002 | Misner | |
| 2003/0017799 | A1 | 1/2003 | Hayashi et al. | |

* cited by examiner

*Primary Examiner*—Derek S Boles
(74) *Attorney, Agent, or Firm*—George P. Kobler; Lanier Ford Shaver & Payne P.C.

(57) ABSTRACT

An orientation-independent compartment pressure relief valve comprises a housing with a throughflow channel having an intake and an exhaust. A flange disposed around the inner wall of said housing defines an aperture within the throughflow channel and sealing flap is secured to the flange sealingly covering said aperture. Sealing flap is comprised of a relatively pliable layer and a relatively rigid layer and is oriented such that relatively pliable layer is in contact with flange. Pliable layer allows sealing flap to flexibly open in response to compartment pressure and rigid layer acts to close sealing flap irrespective of pressure relief valve's orientation in relation to a gravity vector.

17 Claims, 6 Drawing Sheets

ORIENTATION INDEPENDENT COMPARTMENT PRESSURE RELIEF VALVE

BACKGROUND

1. Field

The present invention relates generally to a compartment pressure relief valves and, in particular, to compartment pressure relief that operates irrespective of gravity.

2. Description of the Related Art

Many current automobile designs incorporate compartment pressure relief valves that allow air pressure, built up in the vehicle compartment through running of an air conditioner or shutting a door, to escape the compartment to ensure a comfortable environment. Many designs are flap-type valves, for example, U.S. Pats. Nos. 4,972,765 to Dixon, 5,355,910 to Gies et al, 6,210,266 to Barton, and 6,458,027 to Stiehl and U.S. Pat. App. Pub No. 2003/0017799 (Hayashi, et al). A common feature of these valve designs is that they rely upon the force of gravity to close the valve. Therefore, the valve must be oriented in the vehicle structure so that it may close properly with gravity, i.e., they must be upright and mounted within a vertical structure of the compartment. This has some disadvantages.

One disadvantage is that the provision for pressure relief in vehicle design is often an after-thought. The pressure relief valve must be specially designed for the space provided for it, which is typically the engine compartment firewall, the rear wall or a door, and machinery must be specially tooled to fabricate the valve. This leads to increased expense and, perhaps increased time from design to market. Furthermore, vehicles parked on steep inclines may allow the gravity-dependent valves to open when not desired.

There have been attempts to create gravity-independent valves which may be placed within any vehicle compartment wall without consideration of orientation. Some of these designs spring-load the flap in the closed position, but this increases the parts required to make the valve and increases the odds of mechanical failure.

One highly-prized goal in many vehicle designs is noise reduction. The above designs do not contribute to this goal as they tend to suffer from undesirable noise levels during use as a result of the flap re-engaging with the valve seat when closing.

For the foregoing reasons, there is a need for a low-cost vehicle compartment pressure relief valve that can be mounted in any orientation in the vehicle structure and that meets or exceeds current noise reduction design levels.

SUMMARY

The present disclosure is directed to an orientation independent compartment pressure relief valve that satisfies this need.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
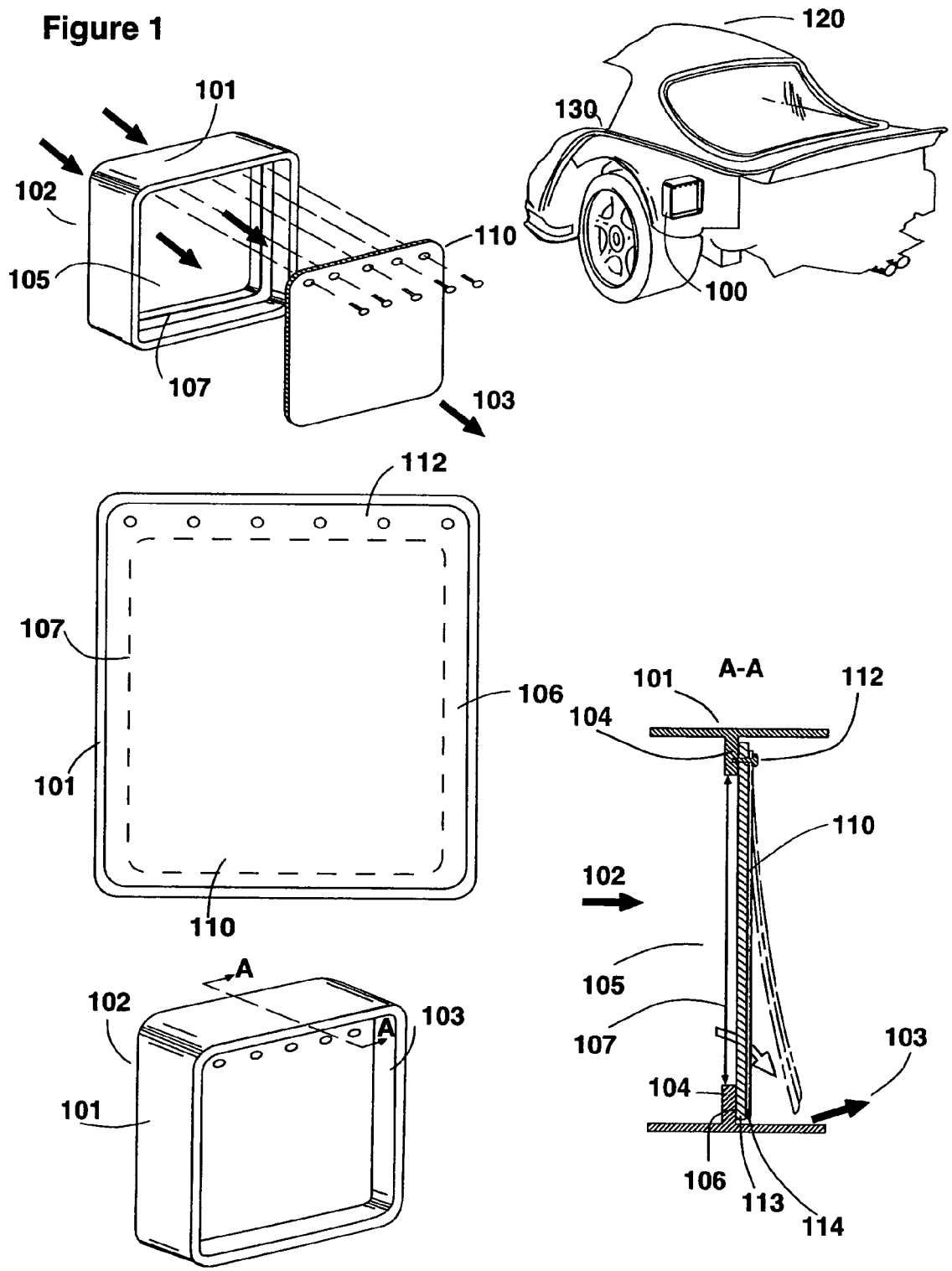
FIG. 1 is an exploded perspective view along with a plan and a cross-sectional view of one embodiment of the present invention.

The various embodiments of the present invention and their advantages are best understood by referring to FIGS. 1 through 5 of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

A pressure relief valve 100 according to the present invention comprises a housing 101 defining at least one throughflow channel 105. Housing 101 has inlet 102 and exhaust 103. When mounted in the wall of vehicle 120, inlet 102 orients to the interior of compartment 130 defined by the vehicle wall, and conversely, exhaust 103 orients to the exterior of compartment 130. Throughflow channel 105, therefore, allows fluid communication from the interior to the exterior of compartment 130.

Flange 104 is disposed about the inside wall of housing 101 and defines aperture 107 within throughflow channel 105. Sealing flap 110 covers aperture 107 defined within throughflow channel 105, and is attached to housing 101, according to the present embodiment, by a single edge 112 and lays upon valve seat 106 which is the side of flange 104 facing exhaust 103. Sealing flap 110 is dimensioned so as to provide a margin such that sealing flap 110 rests on valve seat 106.

Sealing flap 110 comprises a relatively pliable layer 113 and a relatively rigid layer 114. Hereinafter, for convenience, relatively pliable layer 113 may sometimes simply be referred to as "pliable layer" and relatively rigid layer 114 may sometimes simply be referred to as "rigid layer." Sealing flap 110 is situated such that pliable layer 113 is oriented toward inlet 102 and contacts valve seat 106 when sealing flap 110 is in a closed position. Rigid layer 114, therefore, is oriented toward exhaust 103. In this embodiment, sealing flap 110 may be between about 0.007" to about 0.040" in thickness.

Pliable layer 113 may be made from a suitable rubber or elastomeric providing relatively high flexibility and light weight. Inventor has had success using an ethylene propylene dieneter polymer (EPDM) rubber sheet approximately from 0.005" to about 0.030" will allow deviation to the upper and lower specifications. EPDM exhibits high tensile strength and excellent resistance to punctures, UV radiation, weathering and microbial attack. It is also highly flexible material with a low co-efficient of thermal expansion and contraction. Other materials that may be used for the pliable layer 113 include a sponge form of EPDM, neoprene, nitrile, or santoprene. Pliable layer 113 may be molded or extruded. It will be appreciated by those skilled in the arts that when sealing flap is in the closed position pliable layer 113 is sealingly engaged with valve seat 106.

As shown in FIG. 1, rigid layer 114 may be bonded or laminated to pliable layer 113 such that both layers form a single integrated sealing flap 110. As customers often determine pliable layer's thickness, the rigid layer should be 0.002" to about 0.010". In this embodiment, rigid layer should be made from a material compatible with such a bonding or lamination process. Rigid layer 114 may be bonded to pliable layer 113 in a variety of ways known to those skilled in the relevant arts. Rigid layer 114 may be fabricated from rigid mylar, nylon, polypropylene, polyethylene, high-density polyethylene (HDPE), Lexan®, or even stainless steel metal shim stock. Rigid layer 114 should be formed from material that is only somewhat flexible but with sufficient shape memory to quickly seek its original shape after being flexed. In addition, it should be compatible for use with the material selected for the pliable layer. Advantageously, in manufacture, once pliable layer 113 and rigid layer 114 are bonded together to become an integrated sheet, sealing flap 110 may be obtained simply by cutting the integrated sheet to desired dimension.

In operation, pressure within a sealed compartment may increase due to running of an air conditioner or by simply shutting compartment doors. Such pressure is in communication with pressure relief valve 100 and, specifically, with pliable layer 113 of sealing flap 110. When pressure within compartment 130 is sufficiently great, enough force is exerted on sealing flap 110 to cause it to open exteriorly allowing air to escape, thus relieving pressure within in compartment 130. Therefore, sealing flap 110 is constructed such that it is sufficiently lightweight and flexible to allow actuation of sealing flap 110 when compartment internal pressure rises above outside pressure.

When pressure within compartment 130 has decreased, opening force is no longer exerted on sealing flap 110. Rigid layer 114 now functions to bring sealing flap 110 to its closed position in whereby pliable layer is in sealed contact with valve seat 106. Rigid layer 114 is formed of a material which displays shape memory characteristics. Thus, after rigid layer 114 has been deformed due to the opening of sealing flap 110, rigid layer 114 will seek to return to its starting shape which is where sealing flap 110 is in its closed position.

Rigid layer 114 is stiff enough to maintain its shape opposing a force of about 1 g assuming acting on sealing flap. For example, if pressure relief valve 100 is oriented such that sealing flap 110 is parallel to the earth and rigid layer is downward and pliable layer is atop rigid layer, rigid layer possesses sufficient shape memory, or stiffness, to prevent sealing flap 110 from sagging or falling open. At the same time, rigid layer 114 is sufficiently flexible to allow sealing flap 110 to flex open in response to pressure from the interior of compartment 130. An advantage of this embodiment is that as rigid layer 114 seeks its original shape, it relatively slowly forces sealing flap 110 back to the closed position. The result is a substantial reduction of undesirable flapping noise normally attendant with gravity-closed flap-type valves.

Figure 2:
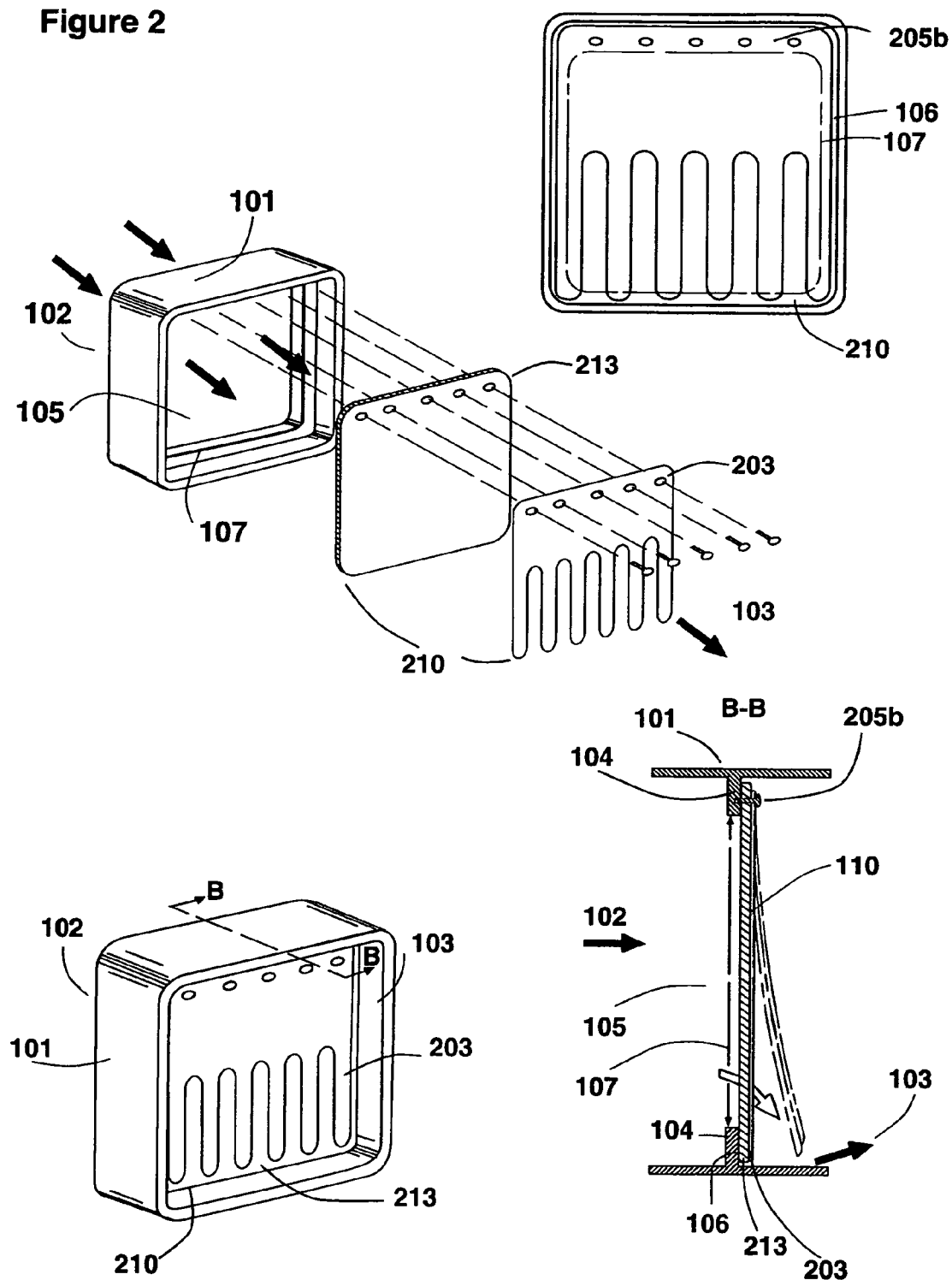
FIG. 2 is an exploded perspective view along with a plan and a cross-sectional view of a further embodiment of the present invention.

FIG. 2 is an expanded view of another embodiment of the present invention where sealing flap 210 is a non-integrated flap assembly of two separate components comprised of pliable layer 213 and rigid layer 203. In this embodiment, rigid layer 203 is not bonded or laminated to pliable layer 213 but simply overlays pliable layer 213 and is secured to housing 101 along with pliable layer 213 at edge 205b. Rigid layer 203 may be fabricated from rigid mylar, nylon, polypropylene, polyethylene, high-density polyethylene (HDPE), Lexan®, or even stainless steel metal shim stock or any other polymeric demonstrating lightweight and adequate rigidity and may be between about 0.002" to about 0.10" in thickness. Pliable layer 213 may be between about 0.005" to about 0.30" in thickness.

It will be appreciated by those skilled in the relevant arts that the flexibility and weight of sealing flap assembly 210 may be adjusted by forming rigid layer 203 as a comb structure. The number and width of the comb's tines, obviously, affect the flexibility of rigid layer 203, i.e., the fewer the tines and the thinner the tines, the more flexible will be rigid layer 203. However, the greater the flexibility, the less support rigid layer 203 will be able to provide to close sealing flap 210.

Figure 3:
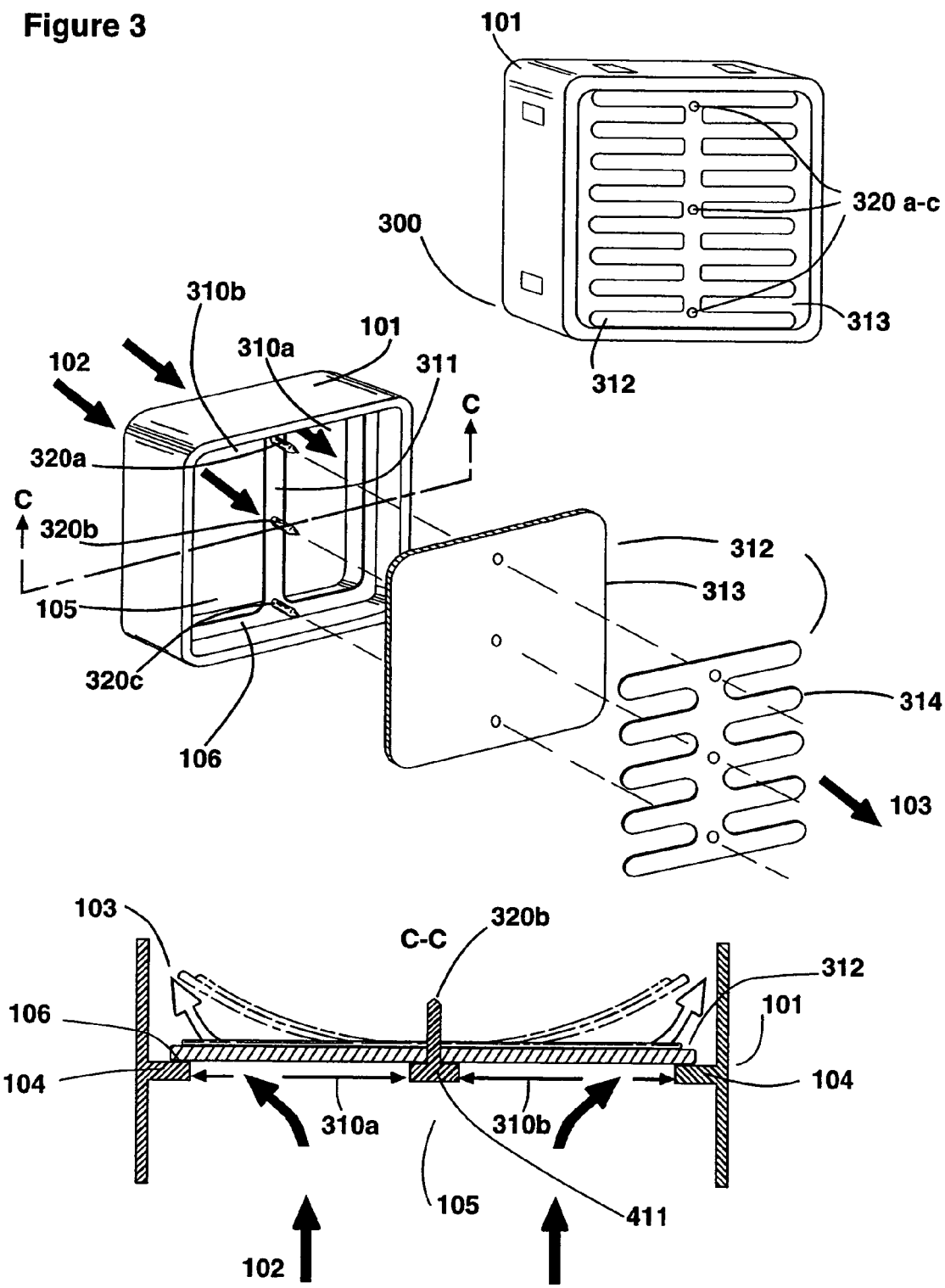
FIG. 3 is an exploded perspective view along with a plan and a cross-sectional view of a further embodiment of the present invention.

With reference to FIG. 3, a further embodiment of the invention is presented. Pressure relief valve 300 includes housing 101 with a throughflow channel 105 inlet 102 and exhaust 103. Flange 104 is disposed about the inside wall of housing 101 defining an opening which is spanned by support 311, thus defining two apertures 310a, b. Sealing flap 312 is secured to housing 101 at support 311 in lieu of at flange 104 through the middle of sealing flap 312 instead of at an edge thereof (e.g., FIG. 1). As with the previously disclosed embodiments, sealing flap 312 is comprised of two layers, a relatively pliable layer 313 and a relatively rigid layer 314. Again, the layers may be referred to as simply "pliable layer" and "rigid layer" respectively.

Sealing flap 312 may be comprised of pliable layer 313 and rigid layer 314 as two separate elements which are secured together to support 311. Although it is not shown in FIG. 3, sealing flap 312 may also be one component wherein rigid layer 314 is laminated or bonded to pliable layer 313, as initially described with reference to FIG. 1. Sealing flap 312 (or sealing flap assembly) may be secured to support by a variety of techniques known in the art. One method, known in the art, which will benefit a manufacturer of the invention, is heat staking. This is advantageous because it requires less individual parts as housing 301 including support 311 can be molded in one piece to include stakes (320a-c). In assembly, the step of heating the stakes may be automated, thus reducing time and costs.

Those skilled in the art will appreciate that, although the drawings depict flange 104, and thus valve seat 104 and sealing flap, being disposed vertically with respect to housing, flange 104 may also be angled with respect to vertical. For example, reference is made to FIG. 4A, wherein depicted is pressure relief valve 400 including housing 401 defining at least one throughflow channel 405 and having an intake 402 and an exhaust 403. Disposed within housing inner wall is flange 404, the side of which facing exhaust 403 is valve seat 407, said flange 404 defining an aperture within throughflow channel 405. Sealing flap 410 (or sealing flap assembly if a non-integrated sealing flap is used), covers aperture. In this embodiment, sealing flap 410 is secured to flange 404 by a single edge 408. Flange 404 is angled with respect to vertical, and thus, sealing flap 410, resting upon valve seat 407, is also angled with respect to vertical.

Figure 4A:
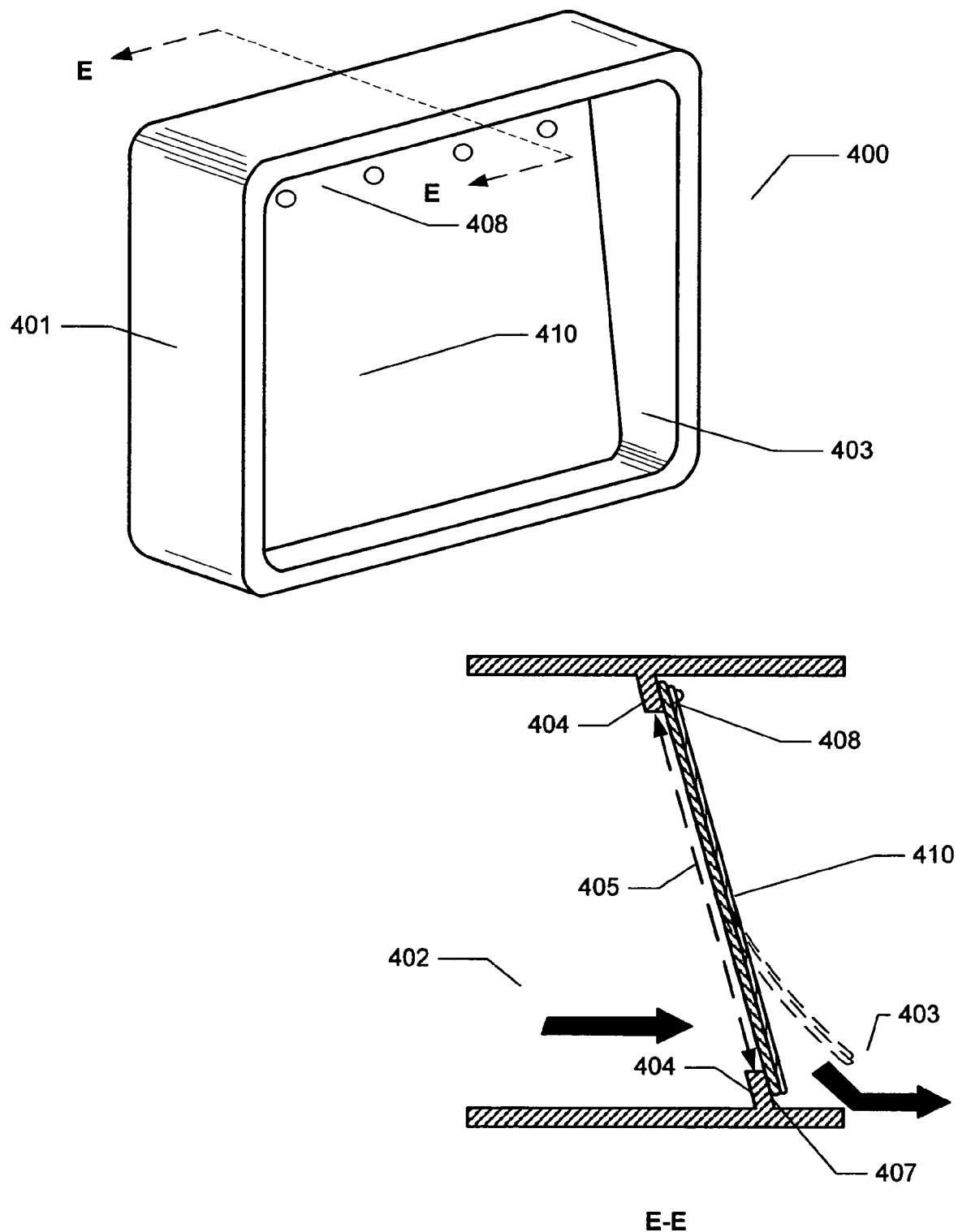
FIG. 4A is a perspective and cross-sectional view of a further embodiment of the present invention.
Figure 4B:
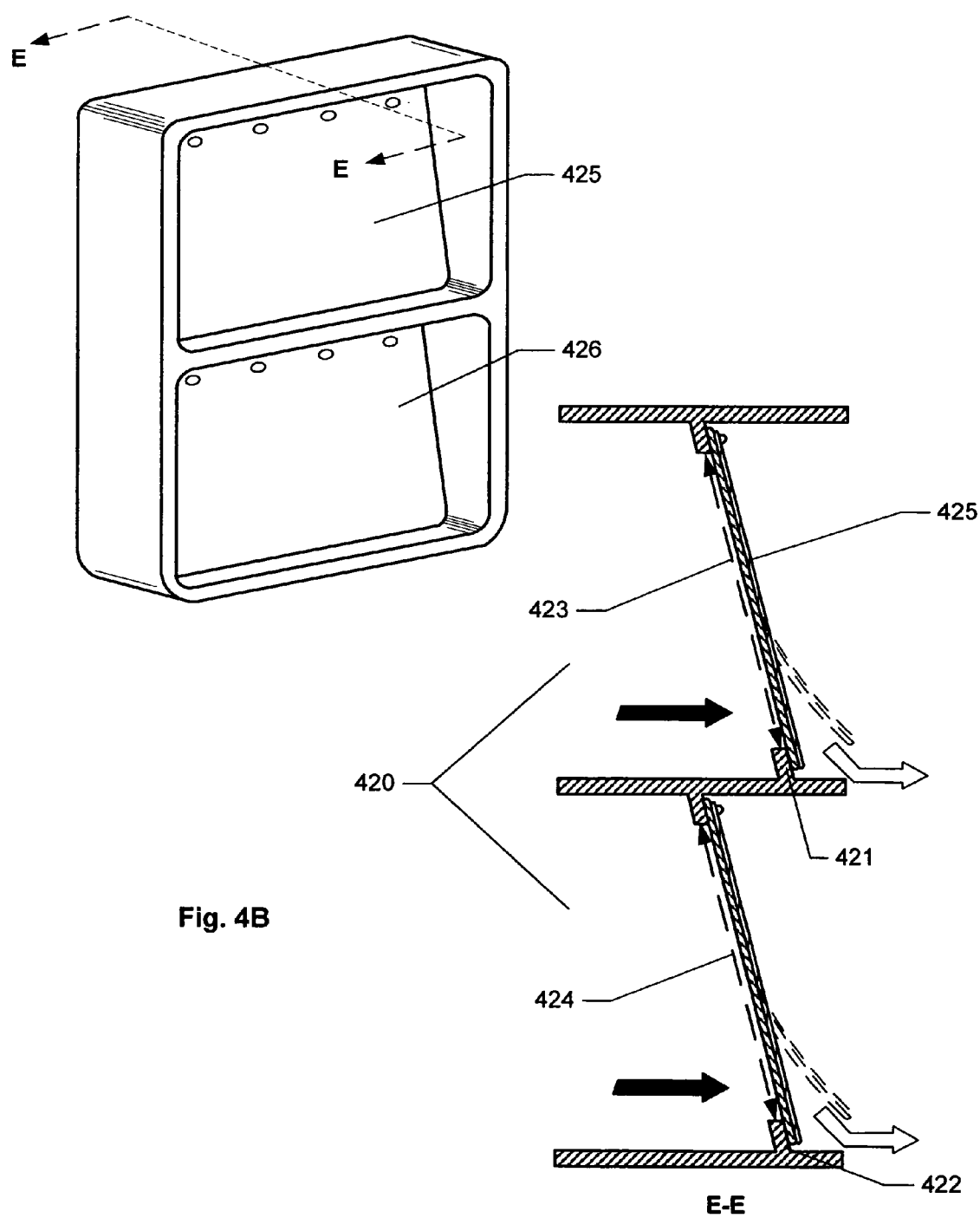
FIG. 4B is a perspective and cross-sectional view of a further embodiment of the present invention.

FIG. 4B depicts a pressure relief valve with a throughflow channel 420 bifurcated vertically wherein first and second valve seats 421, 422 are canted with respect to vertical. First and second apertures 423, 424 are covered with first and second sealing flaps 425, 426, (or sealing flap assemblies if non-integrated sealing flaps are used).

Housing 101 may incorporate interlocks (not shown) to allow pressure relief valve to be joined with one or more like pressure relief valves. A variety of interlocking methods, known to those skilled in the art, may be employed. For example, as would be understood by those skilled in the art, housing may be formed such that a male interlocking member projects from housing 101 an outer wall. A female interlocking recess may be formed in the outer wall on the opposite side of housing 101 from male interlocking member and dimensioned such that a male interlocking member of a like pressure relief valve may be lockingly inserted therein, thereby coupling two pressure relief valves. Housing 101 may incorporate one or more interlocking components on a side, and interlocking components should preferably be alternated male and female on any side of housing 501 to be interlocked with second pressure relief valve.

Interlocking two or more pressure relief valves together gives designers and manufacturers flexibility, over and above that afforded by the fact that the valve may be mounted independent of orientation. For example, often the designs for pressure relief of vehicle compartments occur as afterthoughts and designers and engineers are restricted to those designs for pressure relief valves that are currently on the market. If a designer desires greater pressure relief than is available with a single pressure relief valve, they may attach two or more valves together, again, in any orientation with respect to the source of pressure.

Figure 5:
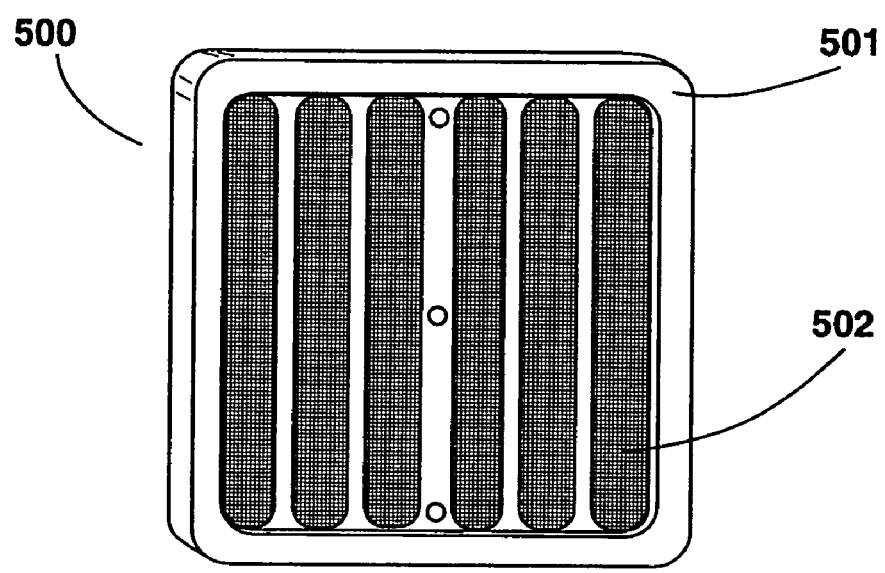
FIG. 5 is a plan view of a plastic cover for use with a pressure relief valve according to the present invention.

A possible consequence of using present invention is that in some orientations and embodiments, the valve may be susceptible to permitting dirt and water from the exterior environment into the compartment, or at least into housing 101 interior. To mitigate against this possibility a cover 500, an example of which is shown in FIG. 5, may be employed with pressure relief valve. Cover 500 is dimensioned to fit snugly over, and may be secured to, the exhaust side of pressure relief valve housing 101. Cover 500 comprises a frame 501 preferably formed of the same material as that from which housing 101 is formed. Cover 500 also comprises screen 502 that prevents in the passage of dirt and water, but also the flow of air therethrough.

As described above and shown in the associated drawings, the present invention comprises an apparatus for an orientation independent compartment pressure relief valve. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. An orientation independent compartment air pressure relief valve comprising:
   a. a housing, said housing comprising a throughflow channel for allowing fluid communication from an intake of said channel to an exhaust of said channel; and
   b. a sealing flap secured to said housing such that said sealing flap closes said exhaust of said channel and is adapted to flexibly open in response to pressure, said sealing flap comprising a relatively pliable layer oriented toward said intake and a relatively rigid layer dimensioned to be substantially co-extensive with said pliable layer and oriented toward said exhaust, whereby said relatively rigid layer operates to close said sealing flap irrespective of said pressure relief valve's orientation with respect to gravity.

2. The pressure relief valve of claim 1, wherein said relatively rigid layer is bonded to said relatively pliable layer.

3. The pressure relief valve of claim 2, wherein said sealing flap is secured by one sealing flap edge to said housing.

4. The pressure relief valve of claim 3, wherein said housing further comprises interlocks whereby said housing may be coupled with a like housing.

5. The pressure relief valve of claim 3, further comprising a support spanning the exhaust end of said channel.

6. The pressure relief valve of claim 2, further comprising a support spanning the exhaust end of said channel.

7. The pressure relief valve of claim 6, wherein said sealing flap is secured to said support.

8. The pressure relief valve of claim 7, wherein said housing further comprises interlocks whereby said housing may be coupled with a like housing.

9. The pressure relief valve of claim 8, wherein said sealing flap is secured to said support by heat staking.

10. The pressure relief valve of claim 1, wherein said relatively rigid layer is a comb, said comb having a plurality of tines and overlays said relatively pliable layer.

11. The pressure relief valve of claim 10, wherein said sealing flap is secured by one sealing flap edge to said housing.

12. The pressure relief valve of claim 11, wherein said housing further comprises interlocks whereby said housing may be coupled with a like housing.

13. The pressure relief valve of claim 12, further comprising a support spanning the exhaust end of said channel.

14. The pressure relief valve of claim 11, further comprising a support spanning the exhaust end of said channel.

15. The pressure relief valve of claim 14, wherein said sealing flap is secured to said support.

16. The pressure relief valve of claim 15, wherein said sealing flap is secured to said support by heat staking.

17. The pressure relief valve of claim 16, wherein said housing further comprises interlocks whereby said housing may be coupled with a like housing.

* * * * *